United States Patent
Shoup

[15] 3,678,144
[45] July 18, 1972

[54] SILICATE BODIES CONTAINING COPRECIPITATED OXIDES

[72] Inventor: Robert D. Shoup, Painted Post, N.Y.
[73] Assignee: Corning Glass Works, Corning, N.Y.
[22] Filed: June 12, 1970
[21] Appl. No.: 45,906

[52] U.S. Cl. ................. 264/42, 264/63, 106/38.35, 106/40, 106/74
[51] Int. Cl. ............................................. B29h 7/20
[58] Field of Search ............... 106/40, 41, 52, 54, 69, 74, 106/38, 35; 264/42, 63

[56] References Cited

UNITED STATES PATENTS

| | | | |
|---|---|---|---|
| 3,507,944 | 4/1970 | Moore | 106/69 |
| 3,028,340 | 4/1962 | Gandon et al | 106/38.35 |
| 3,306,756 | 2/1967 | Miller | 106/74 |
| 3,095,312 | 6/1963 | Holmes | 264/42 |
| 3,436,236 | 4/1969 | Gamber et al. | 106/69 |
| 3,432,312 | 3/1969 | Feagin et al | 106/38.35 X |
| 2,968,572 | 1/1961 | Peeler, Jr. | 106/74 |
| 2,919,996 | 1/1960 | Teja | 106/74 |
| 2,886,404 | 5/1959 | Teja | 18/54 |

Primary Examiner—Donald J. Arnold
Assistant Examiner—David A. Jackson
Attorney—Clarence R. Patty, Jr. and Clinton S. Janes, Jr.

[57] ABSTRACT

This invention relates to the discovery of a method for incorporating various oxides into silica-containing porous and non-porous glass materials by dissolving soluble compounds of the additive oxides, characterized as $M_xO_y$, into solutions, colloidal solutions, or suspensions of soluble silicates, reacting the mixture with an organic compound, and then firing the thus-formed body at temperatures below the softening point of the particular glass composition for a sufficient length of time to produce the porous body or non-porous glass body containing the added oxides intimately bonded to the silica network.

7 Claims, No Drawings

3,678,144

SILICATE BODIES CONTAINING COPRECIPITATED OXIDES

BACKGROUND OF THE INVENTION

Copending U.S. Pat. application Ser. No. 45,806, filed concurrently herewith in the names of J. E. Pierson and S. D. Stookey, teaches a process for producing a porous silica body from soluble silicate solutions by dissolving certain organic compounds in the soluble silicate solution, reacting the solution so as to polymerize the silica into a network structure, and then treating the body so as to remove all constituents other than the silica. That process requires the use of true solutions, colloidal solutions, or suspensions of soluble silicates and organic gelation agents selected from the group consisting of formaldehyde, paraformaldehyde, formamide, and glyoxal. These solutions, colloidal solutions and/or suspensions must contain concentrations of silica greater than about one mole per liter in solution to produce the desired structure. Although it may be desirable to have as much silica as possible in the solution, as a practical matter, it is difficult to obtain concentrations greater than about 12 moles per liter. Since silica itself is insoluble, the silica is added in the form of a soluble silicate which is normally an inorganic alkali metal silicate or an organic ammonium silicate, preferably, a quaternary ammonium silicate. The ratio of the alkali metal and/or ammonium ion-to-silica can vary, but the amount of silica in solution must be at least 1 mole per liter and, preferably, three to 12 moles per liter. The concentration of alkali metal oxide and/or ammonium ion must be sufficient to produce a pH greater than about 10. Normally, it is preferred to maintain the pH below about 15.

To the soluble silicate solution are added the aforementioned organic gelation agents which uniformly dissolve in the solution and react very slowly and uniformly throughout the solution to neutralize the alkali and/or ammonium ion present and, consequently, polymerize the silica. This neutralization commonly causes a reduction of the pH of the solution from greater than 10 to the range of about seven to nine. The desired concentration of the organic present in the solution is related to the alkali oxide and/or ammonium ion present. If the organic concentration is very high, undesirable instantaneous gelation of the solution can occur; or on the other hand, if concentration is too low, the desired products cannot be produced. When the ratio of the organic to the alkali oxide and/or ammonium ion assumes particular values, a material which is leachable in cold water to a porous silica material can be produced. The solutions, colloidal solutions, and/or suspensions of soluble silicate and organic compound are reacted by heating them at moderately low temperatures for a sufficient length of time to cause the reaction to occur. The effective reaction temperatures fall between the freezing point and the boiling point of the solution. It will be understood, of course, that higher temperatures will be operable at elevated pressures. Normally, reaction temperatures between about 40° C. and 100° C. are employed with reaction times between a few seconds, say five seconds, and 24 hours. Reaction or "curing" times as long as 720 hours have been utilized but with no essential improvement in properties over those obtained within shorter periods. The reaction which occurs can be viewed as a phase separation; that is, the organic material reacts with the alkali or ammonium ion so as to produce a less basic solution wherein the silica may then polymerize to form the silica network.

After the reaction has taken place, the products described above are washed in water, acids, or other suitable solvents and then may be utilized for various purposes. In the case of the water-leachable solid, the material is washed in water so as to leach out the water soluble phases and thus leave a coherent, open-celled, porous silica material. The network which remains after leaching, is essentially pure silica. It is believed that in the case of the lower organic concentrations or ratios there is not an adequate amount of the organic present to allow the reaction to proceed sufficiently to secure the formation of a silica network.

Copending U.S. Pat. application Ser. No. 45,905, filed concurrently herewith in the names of F. L. Orso and T. E. Pierce, teaches that the reacted body, i.e., the unleached body, can be fired in a particular manner to thereby be consolidated to a solid glass body with essentially no change in body geometry.

Copending U.S. Pat. application Ser. No. 45,907, filed concurrently herewith in the names of H. E. Meissner and S. D. Stookey, teaches that the porous glass bodies disclosed by Pierson and Stookey and the glass bodies disclosed by Orso and Pierce can be produced utilizing certain esters or inorganic salts which hydrolyze to weak acids as the gelation agents. The composition of the solid glass or porous glass bodies produced by the aforementioned processes is limited to those compositions having silica, alkali metal oxide, and/or divalent oxides of the inorganic salts which hydrolyze to weak acids. Therefore, it has been found desirable to utilize other additive oxides which are compatible with the above-described solutions to further modify the glass properties and glass composition ranges which can be produced.

SUMMARY OF THE INVENTION

I have discovered that I can produce monolithic, porous and non-porous glass bodies having a substantial range of oxide compositions (up to about 45 percent by weight) by introducing soluble additive metal oxides into the solution from which the porous or solid glass body is to be produced. The compound must be soluble in water so as to form a true solution and should also form an anionic species or a complex species in solution, be non-volatile, and not reduce the pH of the solution to less than 10. I have discovered that when solutions containing these additive metal oxides are treated in accordance with the processes disclosed in any of the aforementioned copending applications, the additive metal oxide will coprecipitate with the silica to fill the pores and/or be intimately bound to the polymerized silica network. The bodies may then be treated to form a porous structure having the additive metal oxide in the silica network itself after which the porous structure may be then consolidated through heating so as to form a glass having the coprecipitated metal oxide in the glass.

DESCRIPTION OF THE PREFERRED EMBODIMENT

The process requires the preparation of true solutions, colloidal solutions, or suspensions of soluble silicates with the soluble additive metal oxides and certain defined organic compounds. These true and/or colloidal solutions and/or suspensions must contain concentrations of silica greater than about one mole per liter in solution and, preferably, more than three moles/liter in solution to achieve a good bonded structure. A practical maximum silica concentration is about 12 moles per liter. Since silica itself is essentially insoluble in water, the silica is added in the form of a soluble silicate which is normally an organic alkali metal silicate or an organic ammonium silicate, preferably, a quaternary ammonium silicate. In order to maintain the silica in solution, the concentration of the alkali metal and/or ammonium ion, must be sufficient to yield a solution having a pH greater than about 10. To the soluble silicate solution are added certain compounds which uniformly dissolve in the solution and react very slowly and uniformly therewith to reduce the pH of the solution by neutralizing the alkali and/or ammonium ion present, and, thereupon, polymerize the silica. As disclosed by Pierson and Stookey in copending U.S. Pat. application Ser. No. 45,806, those compounds which act to reduce the pH in the solution are selected from the group consisting of formaldehyde, paraformaldehyde, formamide, and glyoxal. The concentrations of those gelation agents are related to the alkali oxide and/or ammonium ion present in the solution and, in the case of all but formamide, the mole ratio of the organic-to-alkali oxide and/or ammonium ion should be between about two and 13. Formamide is more reactive than the other organics and is functionally equivalent in molar concentrations about ½ that of the aforementioned compounds. Hence, the effective mole ratios of formamide-to-alkali and/or ammonium ion range about 0.67–13. In copending application Ser. No. 45,907, Meissner and Stookey disclose that certain esters in concentrations between about 2 and 20 percent by volume and certain organic salts which hydrolyze to weak acids in concentrations of between 2 and 20 percent by weight are suitable gelation agents. As the pH of the solution is reduced through the reaction, silica polymerizes into a network structure. The completely reacted body has a coherent silica network throughout the body. The other products of the reaction are disposed within the interstices of the silica network. The true and/or colloidal solutions and/or suspensions of soluble silicate, soluble additive metal oxide, and organic compound are reacted as indicated above by exposing them to moderately low temperatures, viz., between the freezing point and boiling point of the particular solution, for sufficiently long periods of time to cause the reaction to occur. The reacted body can then be treated in a number of ways. First, the body can be leached or treated with solvents so as to preferentially remove all products other than the silica network. Nevertheless, it may be desirable to leave some of the inorganic oxides such as the alkali metal oxides or the divalent salts in the body and this can be done by the proper selection of the solvent. The porous body may then be utilized by itself or consolidated by firing at a temperature below the softening point of the glass so as to collapse the structure and yield a dense, fused silica glass body or a glass body of a mixed composition having the same geometry as the original article containing the alkali metal oxides or divalent metal oxides. In accordance with the schedules disclosed by Orso and Pierce in U.S. Pat. application Ser. No. 45,905, the reacted body may also be fired to form a glass directly. The volatile constituents are expelled during the firing treatment and the remaining oxides then consolidated to form a solid glass body at relatively low temperatures.

I have discovered that I can add oxides other than those described above to the solutions through the coprecipitation thereof during the polymerization reaction. The oxide species must be soluble in the soluble silicate solutions and, moreover, should form an anionic oxide species or a complex species therein and not reduce the pH of the solution below that at which the polymerization of silica will begin. That is to say, a saturated solution of the metal oxide alone should have a pH greater than 10 or the pH of the solution can be adjusted through the addition of a base thereto. Lastly, the oxide should be nonvolatile since, otherwise, it would be expelled during the polymerization reaction and thus not be present in the final body, whether porous or non-porous.

Those oxides which can be present in the bodies of my invention are set forth in Table I.

TABLE I

| | | | | |
|---|---|---|---|---|
| $Ag_2O$ | $B_2O_3$ | $GeO_2$ | $P_2O_5$ | $WO_3$ |
| $CuO$ | $Al_2O_3$ | $MnO_2$ | $As_2O_5$ | $MoO_3$ |
| $ZnO$ | $Cr_2O_3$ | $PtO_2$ | $V_2O_5$ | |
| $PdO$ | | | | |

Since the metal oxides ($M_xO_y$) in most instances cannot be introduced as the oxide itself but must be introduced as a soluble compound, Table II lists some of the various soluble reagents which I have found may be used to introduce the alkali metal oxide ion into the solution.

TABLE II

| Oxide | Reagent |
|---|---|
| $WO_3$ | $K_2WO_4$ |
| $MoO_3$ | $K_2MoO_4$ |
| $V_2O_5$ | $NaVO_3$ |
| $Cr_2O_3$ | $K_2CrO_4$ |
| $CuO$ | $CuC_4H_4O_6$ |
| $MnO_2$ | $KMnO_4$ |
| $ZnO$ | $Zn(OH)_2$ |
| $Al_2O_3$ | $NaAlO_2$ |
| $P_2O_5$ | $KH_2PO_4$ |
| $PtO_2$ | $H_2PtCl_6$ |
| $Ag_2O$ | $AgNO_3$ |
| $PdO$ | $PdCl_2$ |

Any soluble silicate solution can be utilized in this invention but, for reasons of economy, I prefer to use commercially available solutions. It is apparent that these solutions can be blended so as to obtain various concentrations of silica in the solution provided, of course, the other solution limitations are maintained. Commercially-marketed lithium silicate is a colloidal solution whereas the sodium, potassium, and quaternary ammonium silicates are true solutions. Table III below sets forth the compositions of the silicate solutions which I prefer to utilize and which will be employed throughout the examples of this invention.

TABLE III

Sodium silicate - 6.8 percent $Na_2O$, 25.3 percent $SiO_2$, balance $H_2O$

Lithium silicate - 2.1 percent $Li_2O$, 20.0 percent $SiO_2$, balance $H_2O$

Potassium silicate - 8.3 percent $K_2O$, 20.8 percent $SiO_2$, balance $H_2O$

Quaternary ammonium silicate - 9.9 percent quaternary ammonium ions, 45 percent $SiO_2$, balance $H_2O$ Colloidal silica - 40 percent $SiO_2$, balance $H_2O$ When the gelation agents are added to the solution and the reaction is caused to begin, the silica polymerizes and the additive oxide coprecipitates with the silica. During the reaction, the oxides may change oxidation state but, in any case, the oxides are intimately bound to the polymerized silica network. The oxides may form on the surface of the network or within the actual structure of the network, but, regardless of the mechanism, they can be said to fill the pores and/or be intimately bound to the or in the network. It is believed that any of the gelation agents disclosed in the aforementioned applications can be utilized with the coprecipitated oxides. Thus, if one utilizes the inorganic salt gelation agent, a variety of oxides can be incorporated into the glassy or porous body. Like the organic gelation agents, the quantity of inorganic salt gelation agent employed is that necessary to reduce the pH from 10–15 to the range of about 7–9.

Examples are hereinafter presented as believed to better facilitate an understanding of the Applicant's invention and disclose the best mode of practicing said invention.

EXAMPLE I 7.8 grams of $K_2WO_4$ plus one gram KOH were dissolved in about 10 ml. water and this solution then stirred into 100 grams of the above-described potassium silicate solution contained in a plastic container. Assuming no loss through solubility, 7.8 grams $K_2WO_4$ was calculated to produce 20 percent by weight $WO_3$ in the final fully leached product. 35 grams of paraformaldehyde were added, the solution heated to 40°–50° C. with stirring until the paraformaldehyde dissolved, the plastic container closed, and allowed to gel at room temperature. In general, gelation occurred within 10–60 minutes, the gelled solid assuming the shape of the plastic container and shrinking up to about 10 linearly. Upon removal from the container, the body was a tan, coherent, porous solid exhibiting a uniform shape and good strength.

Free alkali can be removed from the body without leaching out an excessive amount of the tungsten additive by washing in alcohol solutions. Further washing in weak acid-alcohol solutions (1–5 percent acid-95–99 percent alcohol) exchanges hydrogen ions for bound alkali. It will be understood that other leaching solutions are useful which will remove the alkali ions without disturbing the $SiO_2$ network and will remove very little, and preferably none, of the metal oxide additive coprecipitated therewith. X-ray diffraction analysis of the fired body indicated $WO_3$ to be the incorporated species and a scanning electron micrograph showed the tungstate to be in an intimate part of the silica structure rather than a deposit in a pore.

Analysis of the unleached product indicated the presence of about 14% $WO_3$ whereas an analysis of the leached product indicated the presence of about 11% by weight $WO_3$, indicating a loss of about 45 percent through solubility, volatility, etc.

EXAMPLE II 20.7 grams of $K_2WO_4$ were dispersed in about 10 ml. water and this dispersion plus 3 grams of KOH to promote dissolution and to maintain a high pH were then stirred into 100 grams of the above-noted potassium silicate solution contained in a plastic container. This amount of $K_2WO_4$ was calculated to yield a final product containing 40 percent by weight $WO_3$ in the fully leached body. 40 grams of paraformaldehyde were vigorously stirred into the solution at room temperature until dissolved. It was observed that where articles containing more than about 20 percent by weight $WO_3$ were produced, an exothermic reaction resulted at temperatures of 40° C. and higher which led to foaming. This undesirable phenomenon was avoided by clearing the solution (dissolving the paraformaldehyde in the shortest possible time) at low temperatures and allowing it to cool and gel at room temperature in a closed container. Here, again, the gelling reaction took place in about 10–60 minutes. Thereafter, the gel was heated to 70°–90° C. for 15–30 minutes to complete the gel consolidation with a resultant 10 percent linear shrinkage.

The final product was similar in appearance and physical properties to that of Example I and could be leached in accordance with Example I. Analysis of the unleached body indicated a $WO_3$ content of about 19 percent by weight.

EXAMPLE III 3.5 grams of $K_2WO_4$ were dissolved in about 10 ml. $H_2O$ and this solution stirred into a mixture of 30 grams each of the above-mentioned colloidal silica and potassium silicate solutions held within a plastic container, to which one gram of KOH was added to promote dissolution and maintain a high pH. This quantity of $K_2WO_4$ was calculated to produce 10 percent by weight $WO_3$ in the final leached body. Two grams of methyl acetate were stirred into the mixture, the container covered, and the solution heated to 40°–50° C. Gelation occurred within about 30 minutes. Upon removal from the container, the body was a white, coherent, porous solid, uniform in shape and possessing good strength. An analysis of the unleached product indicated about 6.5 percent by weight $WO_3$.

EXAMPLE IV 8.3 grams of $K_2MoO_4$ were dispersed in about 10 ml. $H_2O$ and this dispersion stirred into 100 grams of the above-identified potassium silicate solution in a plastic container. This amount of $K_2MoO_4$ was calculated to yield a product containing 20 percent by weight $MoO_3$ in a leached body. 35 grams of paraformaldehyde were vigorously stirred into this mixture at room temperature until dissolved. Here again, as was the case with $WO_3$ described above, where articles containing more than about 20% by weight $MoO_3$ were produced, an exothermic reaction resulted at temperatures of 40° C. and higher. The container was covered and the solution gelled at room temperature in about 30 minutes. Subsequently, the gel was heated to about 90° C. for 30 minutes to complete gel consolidation with somewhat less than a 10 percent linear shrinkage. The gelled product was a tan, coherent, porous body uniform in shape and exhibiting good strength.

The gelled body was leached in a weak acid-alcohol solution to remove excess alkali. An analysis of the unleached body indicated 14.3% $MoO_3$ whereas an analysis of the leached article indicated the presence of about 11.4 weight percent $MoO_3$. X-ray diffraction analysis of the fired article found $MoO_3$ to be the incorporated species and a scanning electron micrograph indicated the molybdate to be an intimate part of the silica structure and not simply a deposit in a pore.

EXAMPLE V 5.4 grams of $K_2MoO_4$ were dissolved in about 10 ml. $H_2O$ and this solution plus one gram KOH stirred into a mixture of 30 grams each of the above-described colloidal silica and potassium silicate solutions held within a plastic container. This quantity of $K_2MoO_4$ was calculated to produce 15 percent by weight $MoO_3$ in the fully leached product. Two grams of methyl acetate were stirred into the mixture, the container covered, and the solution heated to about 50° C. After about 60 minutes, the gelled body was removed from the plastic container. The body, itself, was a white, coherent, porous solid, uniform in shape and exhibiting good strength.

Excess alkali was removed by leaching in a weak acid-alcohol solution. Analysis of this unleached product showed the presence of about 8 percent by weight $MoO_3$.

EXAMPLE VI 1.4 grams of $NaVO_3$ were dissolved in about 10 ml. water and this solution stirred into a plastic container containing 100 grams of the above the above-mentioned potassium silicate solution. This amount of $NaVO_3$ was calculated to yield 5 percent by weight $V_2O_5$ in the final body. 30 grams of paraformaldehyde were added thereto, the solution heated to 40°–50° C. with stirring until the paraformaldehyde dissolved, the plastic container closed, and the solution maintained at 40°–50° C. until gelled. Commonly, 10–60 minutes dwell time was sufficient with further consolidation of the gel obtained by heating to 70°–90° C. Linear shrinkage during gelation was less than 10 percent. The body removed from the plastic container had a strong, coherent, porous structure and exhibited a light blue-green outer surface with a lighter interior portion.

Free alkali was removed by leaching in an alcoholic solution without dissolving $NaVO_3$. Subsequently, the article was washed in a weak acid-alcohol solution to exchange hydrogen ions for bound alkali ions and produce $V_2O_5$ or its corresponding acid (only very slightly soluble). X-ray diffraction analysis of the fired body indicated $V_2O_5$ to be the incorporated species and a scanning electron micrograph showed the vanadate to be an intimate part of the silica structure and not merely a deposit in a pore. Chemical analysis of the unleached body recorded the presence of about 4 percent by weight $V_2O_5$.

EXAMPLE VII

In calculating to produce a final fully leached product containing about 20 percent by weight $V_2O_5$, 6.7 grams $NaVO_3$ were dispersed in about 10 ml. $H_2O$ and this dispersion plug one gram KOH to promote dissolution and maintain a high pH stirred into 100 grams of the above-described sodium silicate solution held within a plastic container. 35 grams of paraformaldehyde were vigorously stirred into that mixture until dissolved, the solution heated to 40°–50° C. with the plastic container closed, and maintained thereat for about 30 minutes for gelation to occur. Subsequently, the gelled mixture was heated to about 80° C. for about 30 minutes to further consolidate the gel. Linear shrinkage of the gel of less than 10 percent was observed. No foaming problems were encountered at high $NaVO_3$ contents as had been found with $K_2MoO_4$ and $K_2WO_4$. Upon removal from the plastic container, the gelled body had a moderately strong, coherent, porous structure and manifested a deep gray-brown outer surface with a white interior portion.

Excess alkali was removed by leaching in a weak acid-alcohol solution. Analysis of the unleached body gave 17.6 weight percent $V_2O_5$ whereas a chemical analysis of the leached article indicated the presence of about 14.4 percent by weight $V_2O_5$.

EXAMPLE VIII

Three grams $NaVO_3$ were dissolved in about 10 ml. $H_2O$ and this solution stirred into 30 grams of the above-mentioned colloidal silica and potassium silicate solutions held in a plastic container. This amount of $NaVO_3$ was calculated to result in a final fully leached product consisting of about 10 percent by weight $V_2O_5$. Two grams of methyl acetate were stirred into the solution at 40°-50° C., the plastic container closed, and the solution held at that temperature for about 15 minutes to induce gelling. Thereafter, the closed container was heated to about 90° C. to complete gelation and cause some consolidation of the gel. Linear shrinkage of less than about 10 percent was noticed. Upon removal from the plastic container, the body demonstrated a fairly-weak, porous, coherent structure which was white in color.

Chemical analysis of the unleached body indicated the presence of about 8.3% by weight $V_2O_5$. X-ray diffraction analysis of the fired body pointed to $V_2O_5$ being the incorporated species.

EXAMPLE IX

To produce a fully leached body calculated to contain about 20 percent by weight $Cr_2O_3$, 12.8 grams $K_2CrO_4$ solution plus one gram KOH were dissolved in about 10 ml. $H_2O$ and this solution stirred into 100 grams of the potassium silicate solution referred to above contained in a plastic container. 35 grams of paraformaldehyde were stirred into the mixture at 40°-50 C., the plastic container closed, and the temperature maintained for about 15 minutes to cause gelation. The temperature was then raised to 70°-90° C. and held thereat for about one hour to complete gelation and cause some consolidation of the gel.

The initial $K_2CrO_4$ solution is yellow in color and the gelled body is a strong, green, coherent, porous article. The color change reflects the reduction of yellow chromate to the green insoluble chromic oxide by the aldehyde reagent in basic solution. The silica surface catalyzes this reduction because chromate is not readily reduced in basic solution by paraformaldehyde in the absence of silica. The gelled body demonstrates a linear shrinkage of somewhat more than 10 percent.

Contact with a weak acid-alcohol solution, after removal from the closed container, leached out excess alkali. Chemical analysis of the unleached body produced 14.3 weight percent $Cr_2O_3$ whereas chemical analysis of the leached body illustrated the presence of about 12.6 percent by weight $Cr_2O_3$. X-ray diffraction analysis of the fired article showed $Cr_2O_3$ to be the incorporated species and a scanning electron micrograph showed the oxide to be an intimate part of the silica structure and not a simple deposit in a pore.

EXAMPLE X 35 grams $K_2CrO_4$ (calculated to yield a final fully leached product containing about 40 percent by weight $Cr_2O_3$) were dispersed in about 10 ml. $H_2O$ and this dispersion plus 3 grams KOH to promote dissolution and maintain a high pH stirred into 100 grams of the above-described potassium silicate solution held within a plastic container. 40 grams of paraformaldehyde were vigorously stirred into the mixture at 40°-50° C., the plastic container closed, and the temperature maintained for about one hour to induce gelation. The temperature was then raised to about 70°-90° C. for about one hour to further consolidate the gel, linear shrinkage thereof somewhat in excess of 10 percent being noted. No foaming problems were encountered at high $K_2CrO_4$ levels as had been observed with $K_2MoO_4$ and $K_2WO_4$. Upon removal from the plastic container, the body had a moderately strong, coherent, porous structure and was green in color. Analysis of the unleached article indicated the presence of about 27 percent by weight $Cr_2O_3$.

EXAMPLE XI

To produce a final fully leached product calculated to contain about 10 percent by weight $Cr_2O_3$, 5.7 grams $K_2CrO_4$ were dissolved in about 10 ml. $H_2O$ and this dispersion plus two grams KOH stirred into a plastic container holding 30 grams each of the colloidal silica and lithium silicate solutions referred to above. 30 grams of paraformaldehyde and 2 grams of methyl formate were stirred into that solution at 40°-50° C. until dissolved, the plastic container closed, and the temperature maintained thereat for about 15 minutes for gelation to occur. Thereafter, the gel was heated to 70° C. for about one hour to complete gelation and further consolidate it. Linear shrinkage somewhat greater than about 10 percent was observed. When removed from the plastic container, the resultant body was a blue-green, moderately strong, coherent, porous article.

Analysis of the unleached article indicated $Cr_2O_3$ to be present in an amount of about 9.9 percent by weight. Excess alkali was leached out by washing in a weak acid-alcohol solution.

EXAMPLE XII

In order to form a final fully leached product calculated to contain about 5 percent by weight CuO, 1.84 grams $CuSiO_3$ and 3.9 grams $NaKC_4H_4O_6$ were placed in about 10 ml. $H_2O$ and 3 grams KOH added to give a true solution of blue copper tartrate complex. This solution was then stirred into 100 grams of the above-described potassium silicate solution held in a plastic container. 30 grams of paraformaldehyde were stirred into the mixture until dissolved, the plastic container closed, and the temperature thereafter raised to 40°-50° C. for about 10-60 minutes to induce gelation. The body, as removed from the plastic container, was light blue with reddish-brown areas and exhibited a strong, coherent, porous structure. The paraformaldehyde reduces cupric ions to form insoluble red-brown $Cu_2O$ dispersed in a $SiO_2$ matrix. Upon standing in air, the red-brown areas revert to a blue color. Linear shrinkage of about 10 percent was observed in the gelled body.

Free alkali was removed by leaching in water or an alcoholic solution without dissolving the copper reagent. A scanning electron micrograph demonstrated the CuO to be an intimate part of the silica structure rather than simply a deposit in a pore.

EXAMPLE XIII 15.1 grams of $CuSiO_3$ and 31.8 grams $NaKC_4H_4O_6$ were placed in about 10 ml. $H_2O$ and 12 grams KOH added to yield a true solution of blue copper tartrate complex. That amount of $CuSiO_3$ was calculated to produce a final fully leached product containing about 30 percent by weight CuO. 100 grams of the potassium silicate solution referred to above were placed in a plastic container and the $CuSiO_3$-$NaKC_4H_4O_6$ solution stirred therein. 40 grams of paraformaldehyde were stirred into the mixture and some foaming resulted even when the gelation was undertaken at room temperature due to a redox reaction occurring between the aldehyde and the cupric ions. After gelling for about one hour, the foamed body was unexpectedly coherent, though weak, with a relatively uniform porosity and red-brown in color. (Where foaming is undesirable, a non-reducing type reagent, e.g., methyl formate, methyl acetate, ethyl formate, or ethyl acetate, should be used with gels containing more than 20 percent by weight CuO.)

EXAMPLE XIV

To produce a final fully leached article calculated to contain about 10 percent by weight CuO, 3.88 grams $CuSiO_3$, 8.2 grams $NaKC_4H_4O_6$, and 3 grams KOH were dissolved in about 10 ml. $H_2O$. That solution was stirred into a plastic container holding a mixture consisting of 30 grams each of the colloidal silica and the potassium silicate solutions referred to above. Four grams of ethyl acetate were dissolved in that mixture, the plastic container closed, the temperature thereof raised to about 40°-50° C., and held thereat for about one hour to cause gelling. When removed from the plastic container, the body exhibited about 10 percent linear shrinkage with a strong, blue, coherent, porous structure.

X-ray diffraction analysis of the fired article reported CuO to be the oxide species present.

EXAMPLE XV

In order to secure a fully leached article calculated to contain about 22 percent by weight $MnO_2$, five grams $KMnO_4$ were dissolved in 10 ml. $H_2O$. This solution was then run into 50 grams of the above-described potassium silicate solution contained within a plastic container to which one gram KOH was added to aid the dissolution process and maintain a high pH in the solution. Thereafter, 15 grams of paraformaldehyde were added very slowly with strong agitation of the mixture to form a well-dispersed system. The gelation reagent was added very slowly because it caused reduction of the $MnO_4^-$ ions to brown $MnO_2$. The dispersion was strongly agitated, while the temperature thereof was raised to about 40°-50° C., until viscous enough to prevent settling out of the $MnO_2$. Then the plastic container was closed and the mixture held at 40°-50° C. for about 10-60 minutes to induce gelling. Subsequently, the mixture was heated to 70°-90° C. for about 10- 60 minutes to complete the gelling reaction and consolidate the gel somewhat. The body, when removed from the plastic container, was a brown, moderately strong, coherent, porous structure exhibiting about 10 percent linear shrinkage.

Free alkali could be leached out by $H_2O$ or an alcoholic solution without dissolving the manganese additive.

X-ray diffraction analysis of the fired product showed $MnO_2$ to be the manganese oxide species present and a scanning electron micrograph indicated the $MnO_2$ to be incorporated as an intimate part of the silica structure.

EXAMPLE XVI 10 grams of $KMnO_4$ were dispersed in about 10 ml. $H_2O$ and that mixture stirred into 50 grams of the above-mentioned potassium silicate solution in a plastic container which one gram KOH had been added. 10 grams $KMnO_4$ was calculated to yield a final fully leached product containing about 36% $MnO_2$. Five grams of formamide were then added very slowly with vigorous stirring to produce a well-dispersed system. Here, again, the gelation reagent was added very slowly because it reduced the $MnO_4^-$ ions to $MnO_2$. This dispersion was strongly agitated, while the temperature thereof was raised to about 40°-50° C., until sufficiently viscous to preclude settling out of the $MnO_2$. Thereafter, the plastic container was closed, the dispersion maintained at 40°-50° C. for about 30 minutes to cause gelling, and then heated to 70°-90° C. for about 30 minutes to consolidate the gel somewhat. Upon removal from the plastic container, the body was a weak, brown, coherent, porous structure demonstrating about 10 percent linear shrinkage.

EXAMPLE XVII

In order to produce a final fully leached product calculated to contain about 5 percent by weight ZnO, 1.28 grams $Zn(OH)_2$ were dispersed in 10 ml. $H_2O$ and this dispersion stirred into 100 grams of the potassium silicate solution referred to above. To aid in dissolution and to maintain a high pH in the solution, 10 grams KOH were added to the well-stirred mixture in a plastic container so that $ZnO_2^{-2}$ ions were formed. Thereafter, 30 grams of paraformaldehyde were stirred into the solution, the plastic container closed, and the solution heated to 40°-50° C. for 10-60 minutes to cause gelation. The gel was then heated to 70°-90° C. for 10-60 minutes to complete gelation and promote some consolidation. When removed from the plastic container, the body demonstrated less than 10 percent linear shrinkage and was found to have a light tan, strong, coherent, porous structure.

Free alkali could be removed by leaching in a $H_2O$ or an alcohol solution without dissolving the zinc additive. X-ray diffraction analysis of the final body indicated ZnO to be the zinc oxide species present and a scanning electron micrograph illustrated the ZnO to be incorporated as an intimate part of the silica structure rather than simply a deposit in a pore.

EXAMPLE XVIII

To yield a final fully leached body calculated to contain about 20 percent by weight ZnO, 6.1 grams $Zn(OH)_2$ were dispersed in about 10 ml. $H_2O$ and this dispersion stirred into 100 grams of the above-described potassium silicate solution. 25 grams KOH were added thereto and the mixture vigorously stirred in a plastic container to form $ZnO_2^{-2}$ ions. Thereafter, 20 grams of paraformaldehyde and 10 grams of formamide were stirred into the solution, the plastic container closed, and the solution allowed to get at room temperature for about one hour. Subsequently, the gel was heated to 70°-90° C. to promote some consolidation thereof. When taken out of the plastic container, the body exhibited less than 10 percent linear shrinkage and was found to be tan colored with a relatively weak, coherent, porous structure.

EXAMPLE XIX

A solution was made of 1.7 grams $NaAlO_2$ and 10 ml. $H_2O$ which was then added to a plastic container holding 100 grams of the potassium silicate solution referred to above. This amount of $NaAlO_2$ was calculated to yield a final fully leached article containing about 5 percent by weight $Al_2O_3$. KOH was added in the amount of six grams to aid dissolution and keep the pH of the solution at a high level. Thereafter, 30 grams of paraformaldehyde were added with strong agitation of the solution, the temperature of the solution raised to 40°-50° C., the plastic container covered, and the temperature held thereat for about 10-60 minutes to induce gelation. The gel was further consolidated by heating to 70°-90° C. for about 10-60 minutes. When removed from the plastic container, the body was white with a strong, coherent, porous structure.

Free alkali could be leached therefrom in an alcohol solution without dissolving away the aluminate and washing in a weak acid-alcohol solution caused an exchange of hydrogen ions for bound alkali ions.

X-ray diffraction analysis of the fired body indicated $Al_2O_3$ to be the incorporated oxide species and a scanning electron micrograph demonstrated the $Al_2O_3$ to be an intimate part of the silica structure rather than merely a deposit in a pore.

EXAMPLE XX

In order to obtain a fully leached product calculated to contain about 10 percent by weight $Al_2O_3$, 3.6 grams $NaAlO_2$ were dispersed in 10 ml. $H_2O$ and that dispersion stirred into a plastic container holding 100 grams of the above-described potassium silicate solution and 12 grams KOH. Subsequently, 30 grams of paraformaldehyde were added to the solution with vigorous stirring, the temperature of the solution raised to 40°-50° C., the plastic container covered, and the temperature maintained thereat for about 30 minutes to cause gelation. Further consolidation of the gel was achieved by heating at 70°-90° C. for 30 minutes. The body, when taken out of the plastic container, demonstrated linear shrinkage of about 10 percent and was white with a very strong coherent, porous structure.

EXAMPLE XXI

A solution was prepared composed of 5.44 grams $K_2HPO_4$ and 10 ml. $H_2O$ which was then added to a plastic mould containing 30 grams each of the colloidal silica and potassium silicate solutions referred to above. That amount of $K_2HPO_4$ was calculated to result in a fully leached final product containing about 10 percent by weight $P_2O_5$. KOH in the amount of one gram was added to aid dissolution and maintain the pH of the solution at a high level. Thereafter, two grams of ethyl formate were stirred into the solution, the temperature thereof raised to 40°–50° C., the plastic mould covered, and the temperature held thereat for about 10–60 minutes to cause gelation. The gel was further consolidated by heating to 70°–90° C. for about 10–60 minutes. When extracted from the plastic mould, the body exhibited about 10 percent linear shrinkage and was white with a strong, coherent, porous structure.

Free alkali could be removed therefrom in an alcohol solution without significantly leaching out the phosphorous additive. Washing in a weak acid-alcohol solution caused an exchange of hydrogen ions for bound alkali ions and caused some removal of the phosphate.

EXAMPLE XXII

In order to produce a final fully leached body designed to contain about 26 percent by weight $P_2O_5$, 15 grams $K_2HPO_4$ were dissolved in 10 ml. $H_2O$ and this solution mixed into 50 grams of the aforementioned potassium silicate solution contained in a plastic mould to which 2.75 grams KOH had been added. Thereafter, 5 grams of formamide were stirred into the solution, the temperature thereof raised to 40°–50° C., the plastic mould covered, and the temperature maintained thereat for about 30 minutes to induce gelation. The gel was further consolidated by heating to 70°–90° C. for about 30 minutes. When removed from the mould, the gel demonstrated about 25 percent linear shrinkage; the body was distorted, white, strong, and somewhat water soluble.

Leaching in the weak acid-alcohol solution removed a considerable amount of the phosphate-containing material.

EXAMPLE XXIII

A solution was prepared consisting of 2.57 grams $H_2PtCl_6$ and 10 ml. $H_2O$ which was then added very slowly with stirring to a plastic mould containing 100 grams of the above-described potassium silicate solution. That quantity of $H_2PtCl_6$ was calculated to yield a fully leached final product containing about 5 percent by weight $PtO_2$. A well-dispersed yellow precipitate of a hydrous platinum oxide was formed. This dispersion was gently heated to 40°–50° C. and 10 grams of formamide was slowly added with strong agitation, this agitation being continued until the mixture was viscous enough to prevent the dispersion from settling out. The mould was then closed and the mixture allowed to gel at 40°–50° C. for about 10–60 minutes. When removed from the plastic mould, the gelled body demonstrated about 10 percent linear shrinkage and was white with a strong, coherent, porous structure. The white color of the gel is believed to be due to the formation of an amine platinum chloride complex which decomposes on heating to a gray or black oxide.

Free alkali could be extracted therefrom in a $H_2O$ or an alcohol solution without leaching out a significant amount of the additive. X-ray diffraction analysis of the fired body indicated $PtO_2$ to be the oxide species incorporated. This phenomenon is the result of the dispersion rather than the true solution of the $H_2PtCl_6$.

EXAMPLE XXIV

To form a fully leached article calculated to contain about 20 percent by weight $PtO_2$, 12.2 grams $H_2PtCl_6$ were dissolved in 10 ml. $H_2O$ and the solution added very slowly with stirring to a plastic mould containing 100 grams of the above-mentioned potassium silicate and three grams KOH, the latter having been added to aid dissolution and maintain the pH of the mixture at a high level. The resulting yellow precipitate was heated to 40°–50° C. and 10 grams of formamide slowly added with vigorous stirring, this stirring being continued until the mixture was viscous enough to prevent the precipitate from settling out. The mould was then covered and the mixture allowed to gel at 40°–50° C. for about 30 minutes. After removal from the mould, the gelled body exhibited about 10 percent linear shrinkage and was white with a moderately strong, coherent, porous structure.

EXAMPLE XXV

A solution was prepared composed of 7.32 grams $AgNO_3$ and 10 ml. $H_2O$ to which concentrated $NH_4OH$ was added to secure a clear solution of $Ag(NH_3)_2^+$ complex. That amount of $AgNO_3$ was calculated to produce a final fully leached product containing about 20 percent by weight $Ag_2O$. The solution was added to a plastic mould containing 100 grams of the potassium silicate solution referred to above and 5 grams KOH which were included to aid dissolution and maintain the pH at a high level. Thereafter, 30 grams of paraformaldehyde were added slowly with vigorous stirring which resulted in a brown-colored dispersion believed to be $Ag_2O$. This dispersion was heated to 40°–50° C. and stirred until the mixture was sufficiently viscous to prevent the dispersion of settling out. The plastic container was then closed and the temperature held thereat for about 10–60 minutes to cause gelation. The gel was further consolidated by heating to 70°–90° C. for about 10–60 minutes. Upon removal from the mould, the gelled body exhibited about 10 percent linear shrinkage and was brown in color with a moderately strong, coherent, porous structure.

Free alkali could be removed therefrom in an alcohol or water solution without significantly leaching out the silver oxide. X-ray diffraction analysis of the fired body indicated $Ag_2O$ to be the oxide species incorporated therein and a scanning electron micrograph showed the $Ag_2O$ to be an intimate part of the silica structure rather than simply a deposit in a pore.

EXAMPLE XXVI

In order to form a final body containing about 10 percent by weight $Ag_2O$, 3.25 grams $AgNO_3$ were dissolved in 10 ml. $H_2O$ to which concentrated $NH_4OH$ was added to give a clear solution. This solution was run into a plastic mould containing 30 grams each of the above-described colloidal silica and potassium silicate solution to which two grams KOH had been added. A clear solution was formed to which two grams of methyl acetate were added with strong agitation. The resulting brown dispersion was heated, with stirring, to 40°–50° C. and the stirring continued until the mixture was viscous enough to preclude the dispersion from settling out. The plastic container was covered and the temperature maintained at 40°–50° C. for about 30 minutes to induce gelation. The gel was further consolidated by raising the temperature to 70°–90° C. for about 30 minutes. When removed from the mould, the gel demonstrated about 10 linear shrinkage and was brown in color with a strong, coherent, porous structure.

EXAMPLE XXVII

A dispersion was prepared of 8.73 grams $PdCl_2$ in 10 ml. $H_2O$ to which $NH_4OH$ was added until the original red precipitate changed to light pink. It had been calculated that that amount of $PdCl_2$ would yield a final product containing about 20 percent by weight PdO. The dispersion was stirred into 100 grams of the aforementioned potassium silicate solution contained in a plastic mould. Thereafter, 10 grams of formamide were run into the mixture with vigorous stirring, the mixture heated to 40°–50° C., and the stirring continued until an essentially true yellow solution was obtained. The yellow color is indicative of a soluble amine palladium hydroxide or chloride complex (higher additive levels, i.e., greater than about 20 percent by weight, are difficult to dissolve totally and will generally contain dispersed particles). The solution was held at 40°–50° C. with the plastic mould covered for about 10–60 minutes to cause gelation and some consolidation of the gel was undertaken by heating in the mould to 70°–90° C. for about 10–60 minutes.

Removal of the gelled body from the mould showed it to have shrunk about 10 percent linearly. The body was dark gray in color with a moderately strong, coherent, porous structure. Free alkali could be removed therefrom in an alcohol or water solution without disturbing the PdO.

X-ray diffraction analysis of the fired product reported PdO to be the oxide species incorporated therein and a scanning electron micrograph indicate the PdO to be an intimate part of the silica structure rather than merely a deposit in a pore.

EXAMPLE XXVIII

To produce a final product calculated to contain about 10 percent by weight PdO, 3.88 grams $PdCl_2$ were dispersed in 10 ml. $H_2O$ to which $NH_4OH$ was added until the original red precipitate changed to a light pink. This dispersion was stirred into 30 grams each of the above-described colloidal silica and potassium silicate solutions contained in a plastic mould. Thereafter, the two grams of methyl acetate were added with vigorous stirring, the mixture heated to 40°–50° C., and the stirring continued until a true yellow solution resulted. The plastic mould was then covered, the solution held at 40°–50° C. for 30 minutes to gel the solution, and the gel consolidated somewhat by heating at 70°–90° C. for about 30 minutes.

Upon removal of the gel from the mould, the body was seen to have shrunk about 10 percent linearly and was a light yellow color with a very strong, coherent, porous structure.

Where desired, the initial porous gel body can be leached to remove alkali metal ions prior to the consolidation thereof to a solid glass article. Hence, upon removal of the alkali, high firing temperatures will be required to consolidate the gel since the leached body will consist essentially of $SiO_2$ and the additive only. It will be recognized that unleached, partially leached, or totally leached gels can be consolidated to glass articles with the quantity of alkali residing in the body dictating the consolidation temperature. Firing temperatures ranging between about 600°–1700° C. for times ranging about five minutes to eight hours will be required depending upon the composition of the gel. Longer firing times are satisfactory but give no substantial improvement in the properties or structure of the article and, therefore, are not economically sound.

Tables IV–VI record several instances where the initial porous gel body was consolidated to a solid glass article without an intermediate leaching step. In each example, the gelled body was prepared in accordance with the above-recited procedure and dried at 100° C. prior to firing. The bodies were heated at about 100° C./hour to a temperature of 450°–500° C. and held thereat for four to five hours to eliminate carbonaceous materials. Thereafter, the bodies were heated to a top temperature of about 650° C. and held thereat for about two to six hours. The percentages of oxide additive and $K_2O$ are calculated from the starting ingredients and assume no loss thereof in the solutions. Chemical analyses of the alkali contents in the fired articles have indicated losses as high as 50 percent where a soluble silicate alone provides the silica matrix. Products utilizing quaternary ammonium silicate and/or colloidal silica and mixtures of colloidal silica and/or quaternary ammonium silicate with an alkali silicate exhibit lower alkali contents. Thus, such bodies demonstrate less shrinkage during firing. Nevertheless, rapid gelling conditions frequently prevail when large amounts of oxide additives are present in such mixtures so care should be exercised in that practice.

Table IV describes samples containing low levels of additives prepared from alkali silicate precursor solutions. All the examples consolidated at least 50 percent linearly and all had glassy matrices containing numerous trapped bubbles causing opacity. Sharp edges were readily observable indicating little structural deformation other than shrinkage.

TABLE IV

| Example No. | Weight percent additive | Weight percent $K_2O$ | Appearance of consolidated body |
|---|---|---|---|
| XXIX | 0.7 $MoO_3$ | 30 | White opaque glassy solid; homogeneous but bubbles cause opaqueness. |
| XXX | 0.7 $V_2O_5$ | 30 | White opaque glassy solid; uniformly dense, bubbles cause opaqueness. |
| XXXI | 0.6 CuO | 20 | Blue opaque glassy solid; uniform color and texture; bubbles cause opaqueness. |
| XXXII | 0.9 $MnO_2$ | 18 | Violet opaque glassy solid; uniform color and texture; bubbles cause opaqueness. |
| XXXIII | 1.0 $WO_3$ | 18 | Grey opaque glassy solid; uniform color and texture; bubbles cause opaqueness. |
| XXXIV | 0.8 $Al_2O_3$ | 20 | White opaque glassy body; uniform color and texture; bubbles cause opaqueness. |
| XXXV | 0.8 $Cr_2O_3$ | 20 | Green opaque glassy sloid; uniform color and texture; bubbles cause opaqueness. |
| XXXVI | 0.8 $P_2O_5$ | 19 | White opaque glassy solid; uniform color and texture; bubbles cause opaqueness. |
| XXXVII | 0.8 ZnO | 20 | White opaque glassy body; uniform color and texture; bubbles cause opaqueness. |
| XXXVIII | 2.2 $PtO_2$ | 30 | Porous refractory like-body; glassy network; opaque grey surface (possible trapped carbon). |
| XXXIX | 1.7 PdO | 30 | Brown opaque glassy solid; good strength; gradient color areas. |
| XXXX | 4.1 $Ag_2O$ | 30 | White opaque glassy solid; uniform color and texture; bubbles cause opaqueness. |

Table V records several samples identical in composition, manner of gelation, and in manner of firing to those recited in Table IV except that the consolidation was undertaken at reduced pressure, i.e., rather than heating the gelled article in air, the body was heated utilizing a pressure of about 20 mm. It was observed that such a firing technique yielded clear or translucent glass bodies demonstrating that bubbles can be removed from the bodies in this manner.

TABLE V

| Example No. | Weight percent additive | Weight percent $K_2O$ | Appearance of consolidated body |
|---|---|---|---|
| XXIX A | 0.7 $MoO_3$ | 30 | White opaque glassy body; uniform texture and color; bubbles cause opaqueness. |
| XXXII A | 0.9 $MnO_2$ | 18 | Violet opaque porous glassy body; slightly foamed; little consolidation. |
| XXXIII A | 1 $WO_3$ | 18 | Brown opaque porous glassy body; slightly foamed. |
| XXXV A | 0.8 $Cr_2O_3$ | 20 | Light green consolidated glassy body; uniform texture and color; leaning toward translucent. |
| XXXIV A | 0.8 $Al_2O_3$ | 20 | Clear colorless glass; few bubbles; uniform texture. |
| XXX A | 0.7 $V_2O_5$ | 30 | Mostly opaque porous glassy body; some translucent areas. |
| XXXVII A | 0.8 ZnO | 20 | Translucent glassy body; slight hazy surface; uniform color and texture. |
| XXXVI A | 0.8 $P_2O_5$ | 19 | Do. |
| XXXI A | 0.8 CuO | 20 | Light blue translucent glassy body; some bubbles but uniform in color and texture. |

Table VI lists several examples wherein the silicate matrix was provided by a solution composed of 30 grams of each of the colloidal silica and potassium silicate solutions and employing methyl acetate as the gelation agent. Approximate melting temperatures of the resulting articles are provided indicating their low alkali contents even though consolidation at 650° C. was possible. All examples were at least shrunken 50 percent linearly. The only article which definitely melted was the CuO-containing body.

TABLE VI

| Example No. | Weight percent additive | Weight percent $K_2O$ | Approximate melting temperature | Appearance of Consolidated Body |
|---|---|---|---|---|
| XXXXI | 9 $WO_3$ | 16 | Not melted by 1,100° C. | White opaque glassy matrix; uniform in color and texture. |
| XXXXII | 6 $Cr_2O_3$ | 27 | Softened but not flowing by 1,100° C. | Yellow-green opaque glassy matrix; considerable porosity. |
| XXXXIII | 9 $Ag_2O$ | 17 | Not melted by 1,100° C. | White opaque glassy matrix; uniform in color and texture. |
| XXXXIV | 8 CuO | 20 | 725° C. | Blue translucent glass body; uniform in color and texture. |
| XXXXV | 8 $MoO_3$ | 24 | Not melted by 1,100° C. | White opaque refractory-like matrix; uniform in color and texture. |
| XXXXVI | 8 $P_2O_5$ | 24 | Softened but not flowing by 1,100° C. | White opaque glassy matrix; surface glazed; not water durable. |

It is believed that the foregoing examples clearly illustrate the effectiveness of this invention in producing coherent, porous, or solid silicate glass articles containing additive metal oxides in amounts up to about 45 percent by weight, such metal oxides being water soluble, non-volatile, not reducing the pH of the soluble silicate solution below about 10, and forming an anionic species or a complex in solution, wherein such glasses can be formed without undergoing the conventional glassmaking steps of melting batch materials. Whereas only tartrates for the copper and ammonia for the silver were specifically demonstrated as suitable complexes, it must be appreciated that any complexing agent which will combine with the metal to provide the properties demanded thereof can be utilized. Illustrative of such agents are: diethylemetriamine (DETA), triaminotriethyleamine (TATE), ethylenediaminetetraacetic acid (EDTA), and triethylenetetraamine (TETA).

I claim:

1. A method for making monolithic, coherent, porous silicate bodies which comprises the steps of:
   a. preparing a solution having a pH between 10–15 and containing about 1–12 moles $SiO_2$/liter in solution from silicate solutions selected from the group consisting of alkali metal silicates, a quaternary ammonium silicate, colloidal silica, and mixtures thereof;
   b. adding a metal oxide selected from the group consisting of $Ag_2O$, CuO, ZnO, PdO, $B_2O_3$, $Al_2O_3$, $Cr_2O_3$, $GeO_2$, $MnO_2$, $PtO_2$, $P_2O_5$, $As_2O_5$, $V_2O_5$, $WO_3$, $MoO_3$, and mixtures thereof in an amount up to about 45 percent by weight in the form of a compound which is water soluble, non-volatile, will not reduce the pH of said solution below 10, and will form an anionic species or a complex species in solution; and then
   c. reacting an organic compound therewith selected from the group consisting of formaldehyde, paraformaldehyde, formamide, glyoxal, methyl formate, ethyl formate, methyl acetate, ethyl acetate, and mixtures thereof at a temperature between the freezing point and the boiling point of the solution for a sufficient length of time to reduce the pH below 10 and polymerize the silica to form a coherent, porous gelled body having said metal oxide intimately bound in the silica network.

2. A method according to claim 1 wherein said solution contains about 3–12 moles $SiO_2$ per liter in solution.

3. A method according to claim 1 wherein said alkali metal silicates are selected from the group consisting of lithium silicate, sodium silicate, potassium silicate, and mixtures thereof.

4. A method according to claim 1 wherein the reaction temperature ranges between about room temperature and 100° C.

5. A method according to claim 1 wherein the time sufficient to reduce the pH below 10 and polymerize the silica ranges between about five seconds to 24 hours.

6. A method according to claim 1 including the step of removing alkali metal ions present in said porous body by a leaching reagent selected from the group consisting of water, alcohol, weak acid-alcohol solution, and mixtures thereof which does not disturb the silica network.

7. A monolithic, coherent, porous gelled silicate body made in accordance with claim 1.

* * * * *